June 18, 1968  R. W. BOYD ETAL  3,388,801
SPILL PROOF COUPLING AND FILTER UNIT
Filed March 19, 1965
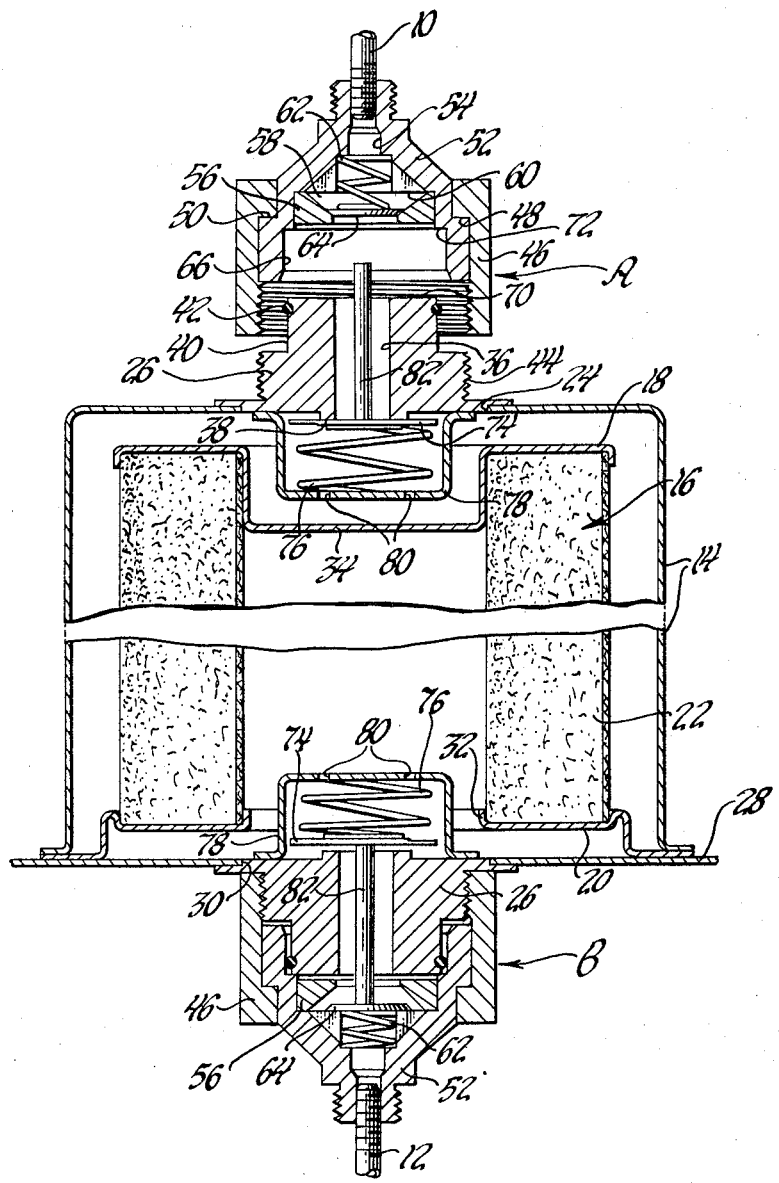
INVENTORS
Richard W. Boyd &
BY Russell K. Welch
George E. Johnson
ATTORNEY 3,388,801
SPILL PROOF COUPLING AND FILTER UNIT
Richard W. Boyd, Flint, and Russell K. Welch, Davison, Mich., assignors to General Motors Corporation, Detroit, Mich., a corporation of Delaware
Filed Mar. 19, 1965, Ser. No. 441,198
1 Claim. (Cl. 210—234)

ABSTRACT OF THE DISCLOSURE

A detachable, in-line fluid filter which has special couplings to prevent spillage of fluid from either the filter casing or the flow line on detachment. The couplings operate independently of the filter element itself and consist of two members, each said member having a valve located therein. When the members are attached a stem mounted on a first valve operates to sequentially open first the valve of the complementary member and then the first valve itself.

---

This invention pertains to filters and more particularly to filter units for clarifying liquids such as gasoline and which are especially adapted to be inserted or removed from fuel supply lines without incurring spillage from the lines or either end of each detached filter casing forming a part of each unit.

Spillage of fuel, particularly gasoline, can be extremely hazardous in many environments but is especially dangerous in an enclosed space such as an inboard marine engine installation. In such a system, employing either a gravity feed or power driven fuel pump or both, it is very desirable that fuel filter replacement be convenient and that such replacement be made without spillage or drainage from the fuel lines. The hazard involved in gasoline spillage in such an installation is so great that the Yacht Safety Bureau filter specification forbids the incorporation of drain valves because of the possibility of inadvertent valve opening or leakage.

An object of the present invention is to provide an improved filter unit having a filter casing which may conveniently be inserted in a liquid supply line or removed therefrom without incurring leakage either from the line or the filter casing.

A feature of the invention is a filter unit including a casing enclosing a filter element and cooperative line coupling means making the casing conveniently detachable from a liquid flow line and the unit having valves urged toward positions sealing the casing and the line when detachment occurs.

This and other important features of the invention will now be described in detail in the specification and then pointed out more particularly in the appended claim.

The one figure in the drawing is a sectional view of an in-line filter casing and filter element with couplings connected into a liquid supply line, this specific arrangement constituting one embodiment of the present invention.

As the flow could be in either direction through the filter unit viewed in the drawing, let it be assumed that conduit 10 is an inlet line and that conduit 12 is an outlet line. Coupling means A and B serve to connect casing 14 and the latter is in the form of a cup enclosing a filter element 16. This element may take any of various forms and as such form per se is not material insofar as the present invention is concerned and is therefore not specifically described herein. A suitable element is fully described, by way of example, in the United States Patent 2,768,752 granted Oct. 30, 1956 in the name of R. S. Thatcher. The filter element of the drawing includes two end plates 18 and 20 between which is retained a porous paper filter material or annulus 22. One end of the casing 14 has an opening 24 closed by a coupling member 26 permanently fixed to the casing in fluid tight relation. The other end of the casing 14 is made up of a support plate 28 with an opening 30 which is similar to the opening 24 and similarly closed. The end plate 18 is impervious and is spaced from the inner wall surface of the casing 14. The end plate 20 is provided with a flanged opening 32 in alignment with a depressed portion 34 of the end plate 18. The outer margin of the plate 20 is flanged and made fluid tight with respect to the casing 14 at its wall 28.

The two couplings A and B involved are structurally similar although reversed and therefore only the coupling A is described herein in detail. Coupling A includes the aforementioned member 26 which has a bore 36 terminating at one end in an annular land or valve seat 38. The member 26 also has a reduced cylindrical portion 40 grooved to retain an O-ring seal 42 and also has a threaded and larger diameter portion 44 for engaging a female member 46 in the form of an internally threaded ring. This ring 46 bears an inner shoulder 48 adapted to bear against a shoulder 50 of a coupling part 52. Part 52 has a passage 54 at one end and to which the inlet line 10 is directly and preferably permanently connected. An annular valve seat member 56 is retained within the part 52 in defining a valve chamber 58 into which protrudes an annular series of stop shoulders 60. These shoulders are on radial webs integral with the part 52. A coiled spring 62 is retained within the series of shoulders and is positioned to urge a secondary valve 64 towards its seat on the member 56. A large diameter recess 66 is provided in the part 52 so that its wall is adapted sealingly to engage the O-ring 42. The end surface 70 of the member 26 is adapted to abut a shoulder 72 on the part 52 when the members 26 and 46 are fully engaged.

A disk or first valve 74 is urged by a spring 76 toward the seat 38 and the spring is held to the member 26 by a retaining cup 78. The cup 78 is apertured as at 80. A rod 82 is fixed to the first valve 74 and extends through the bore 36. In this arrangement, the spring 62 is made weak and the spring 76 is made relatively strong.

Assuming that coupling A is to be joined to form a fluid tight connection between the line 10 and the casing 14, the male member 46 will be placed in position and axially moved to form a seal between the portion 40 and the part 52 by means of the O-ring 42. The proportions are such that this seal is effected by the preliminary engagement of the threads and prior to the engagement of the rod 82 with the secondary valve 64. With a further engagement of the threads, the seal by the O-ring 66 remains assured and then the rod 82 will contact the secondary valve 64. The spring 62, being relatively weak, compared with the spring 76, will yield and the secondary valve 64 will open. Subsequently, the secondary valve 64 will engage the stop shoulders 60 and the first valve 74 will be opened against the resistance of the relatively strong spring 76. This completes the coupling of the line 10 to the casing 14 and with a similar manipulation of the coupling B a flow passage for liquid will be effected from the coupling A and through the apertures 80, around the filter end plate 18, through the filter material 22 and then through the coupling B to the line 12.

We claim:
1. A filter device comprising a filter casing having couplings at opposite ends, each of said couplings comprising complementary threaded male and female members constituting the continuation of a flow path through said casing, first valves in said casing controlling said flow path, strong springs urging said first valves in opposite directions and toward their closed positions, stems extending from said first valves, one of said complementary members of each coupling being fixed to said casing and the other being detachable from said one member and enclosing a secondary valve and a seat, a weak spring urging said secondary valve toward its seat and said casing, each one of said stems being arranged within its respective said one complementary member to contact said secondary valve to hold it open when the other corresponding complementary member is attached, stop means in said other member to limit movement of said secondary valve and the corresponding stem relative to said other member whereby the corresponding first valve is also held open by said stem, sealing means forming a seal between said members while said first and secondary valves are closed and said members are partially engaged, a filter media in said casing and traversing said flow path, and said media being retained in fixed position within said casing and independent of said stems and strong springs.

References Cited

UNITED STATES PATENTS

| | | | |
|---|---|---|---|
| 2,569,243 | 9/1951 | Kovacs | 210—460 |
| 2,706,646 | 4/1955 | Olson | 137—614.04 |
| 2,730,380 | 1/1956 | Espy et al. | 137—614.04 |
| 2,793,752 | 5/1957 | Jay | 210—234 X |
| 3,300,050 | 1/1967 | Perry | 210—234 |
| 3,327,858 | 6/1967 | Eddy et al. | 210—448 X |

FOREIGN PATENTS 863,055   3/1941   France.

SAMIH N. ZAHARNA, *Primary Examiner.*

REUBEN FRIEDMAN, *Examiner.*

W. S. BRADBURY, *Assistant Examiner.*